United States Patent
Hyakutake et al.

(10) Patent No.: US 6,957,541 B2
(45) Date of Patent: Oct. 25, 2005

(54) GAS TURBINE AND OPERATION METHOD OF GAS TURBINE COMBINED ELECTRIC GENERATING PLANT, GAS TURBINE COMBINED ELECTRIC GENERATING PLANT, AND COMPUTER PRODUCT

(75) Inventors: Yoshinori Hyakutake, Hyogo-ken (JP); Yasuhiro Fujita, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/242,767

(22) Filed: Sep. 13, 2002

(65) Prior Publication Data

US 2003/0065436 A1 Apr. 3, 2003

(30) Foreign Application Priority Data

Sep. 13, 2001 (JP) .......................................... 2001-278824

(51) Int. Cl.⁷ .............................................. F01D 25/24
(52) U.S. Cl. ............................. 60/782; 60/806; 415/116
(58) Field of Search ............................. 60/39.182, 772, 60/782, 806; 415/115, 116, 117

(56) References Cited

U.S. PATENT DOCUMENTS

| | | | |
|---|---|---|---|
| 4,516,403 A | | 5/1985 | Tanaka |
| 4,982,564 A | | 1/1991 | Hines |
| 5,340,274 A | * | 8/1994 | Cunha .......................... 415/115 |
| 5,388,960 A | | 2/1995 | Suzuki et al. |
| 5,758,485 A | | 6/1998 | Frutschi |
| 5,778,657 A | * | 7/1998 | Ohtomo et al. ............... 60/806 |
| 5,845,496 A | | 12/1998 | Bachmann |
| 6,105,362 A | * | 8/2000 | Ohtomo et al. ........... 60/39.182 |
| 6,286,297 B1 | | 9/2001 | Wakazono et al. |
| 2001/0022075 A1 | * | 9/2001 | Mandai .................... 60/39.182 |

FOREIGN PATENT DOCUMENTS

| | | |
|---|---|---|
| EP | 0939202 A1 | 1/1999 |
| EP | 0919706 A2 | 6/1999 |
| EP | 0928882 A1 | 7/1999 |
| EP | 1010864 A2 | 6/2000 |
| EP | 1098070 A1 | 5/2001 |
| JP | 61-1809 | 1/1986 |
| JP | 11-93693 | 4/1999 |
| JP | 11-159306 | 6/1999 |
| JP | 2000-248962 | * 12/2000 |

OTHER PUBLICATIONS

Patent Abstracts of Japan, vol. 010, No. 145 (M–482), May 28, 1996 & JP 61 001809 A (Hitachi Seisakusho KK), Jan. 7, 1986.

* cited by examiner

*Primary Examiner*—Michael Koczo, Jr.
(74) *Attorney, Agent, or Firm*—Wenderoth, Lind & Ponack, L.L.P.

(57) ABSTRACT

A casing air temperature Ta and a steam temperature Ts are measured, and if an absolute value ΔT of a difference between these two temperatures is within a predetermined temperature, the gas turbine is connected to the generator. After the connection is done, the load is gradually increased, and the coolant changeover signal is sent from a processor to a controller. The coolant is then changed to the steam, thereby completing the connection of the gas turbine with the generator and the changeover of the coolant.

2 Claims, 9 Drawing Sheets

GAS TURBINE AND OPERATION METHOD OF GAS TURBINE COMBINED ELECTRIC GENERATING PLANT, GAS TURBINE COMBINED ELECTRIC GENERATING PLANT, AND COMPUTER PRODUCT

BACKGROUND OF THE INVENTION

1) Field of the Invention

This invention relates to a gas turbine using air or a steam cooling system for cooling hot sections. More specifically, the present invention relates to an operation method of a gas turbine and a gas turbine combined electric generating plant which can execute a rated operation within a short period of time from the startup of the gas turbine and uses air or steam cooling with respect to hot sections, a computer program which realizes the operation method, and also relates to the gas turbine combined electric generating plant.

2) Description of the Related Art

To increase thermal efficiency in the gas turbine combined cycle, a technique in which steam is used as a coolant instead of air, to cool hot sections such as a dynamic blade and a stationary blade of the gas turbine with the steam, is now being used. The specific heat at constant pressure of dry steam is cp=1.86 kJ/kgK under a standard condition, which is a value almost twice as large as the specific heat at constant pressure of the air, cp=1.00 kJ/kgK. Therefore, the steam has a large heat capacity as compared with the air of the same mass, and the endothermic effect thereof increases. Further, if the wet steam is used as a coolant, latent heat of vaporization of the wet portion can be used for cooling, and hence the endothermic effect thereof further increases. Therefore, when the steam is used for the coolant, the cooling efficiency can be increased over the efficiency when using the air, and hence the temperature of the combustion gas at the entrance of the turbine can be set high. As a result, the thermal efficiency can be improved.

The air from the compressor has been conventionally used for cooling the dynamic and stationary blades of the turbine. However, if this compressed air is used for cooling, the work that can be taken out from the turbine decreases. Hence, if steam is used instead of the air, the cooling air for the dynamic and stationary blades can be saved, and the work that can be recovered by the turbine increases by this amount, whereby the generating efficiency can be increased.

Figure 9:
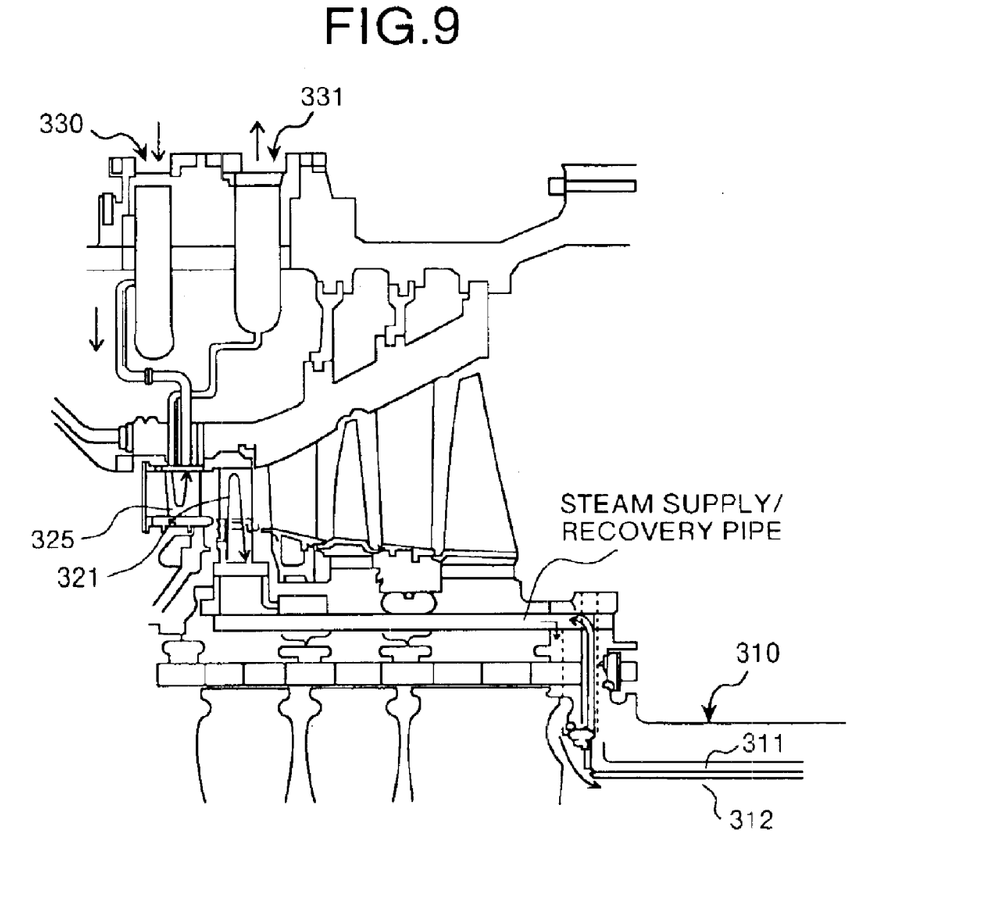
FIG. 9 is a partial cross section of the gas turbine in which steam cooling is applied for dynamic and stationary blades.
Figure 10:
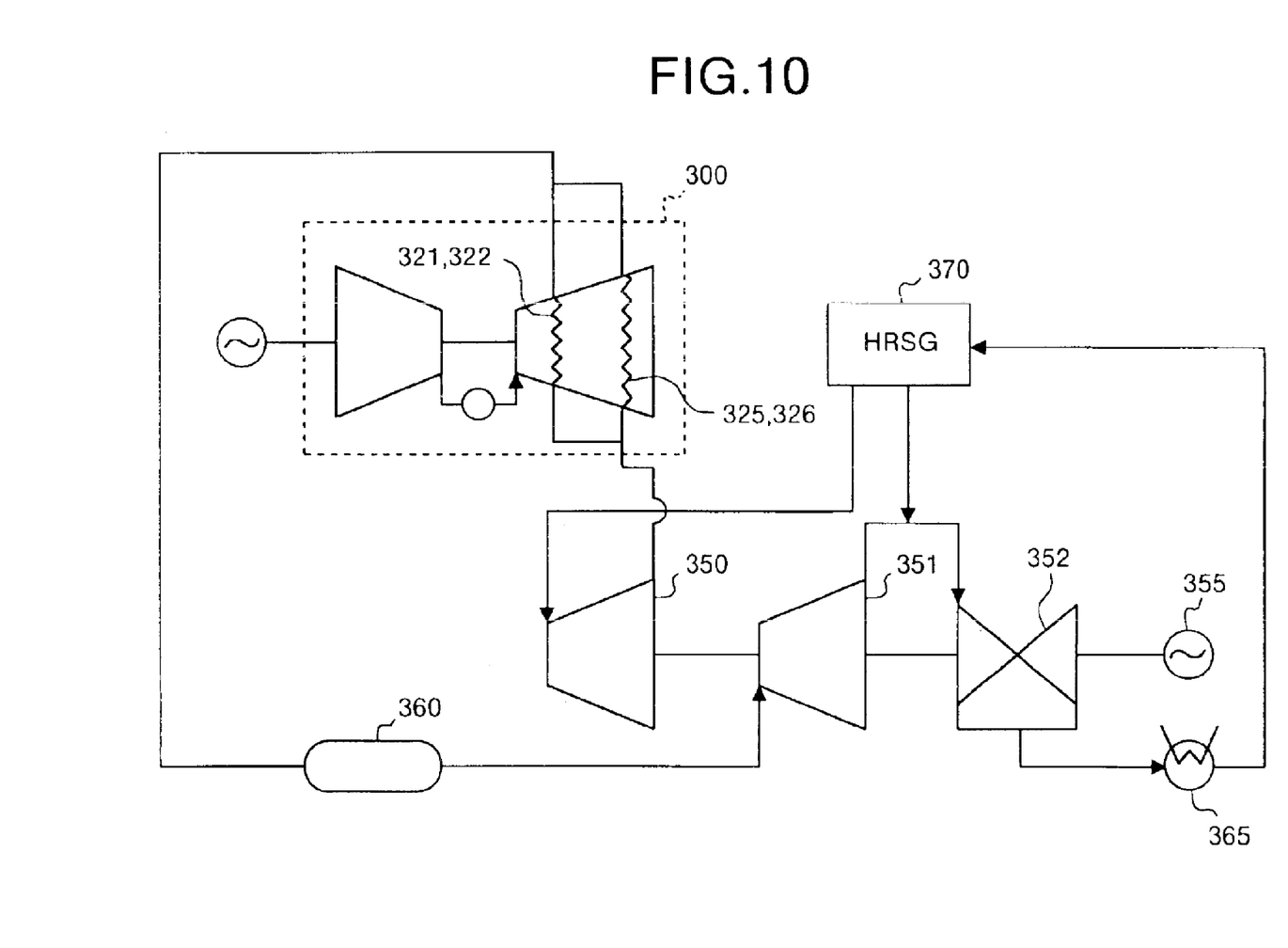
FIG. 10 is a schematic diagram showing a gas turbine combined electric generating plant adopting steam cooling for hot sections.

FIG. 9 is a partial cross section of a gas turbine in which steam cooling is applied for dynamic and stationary blades. FIG. 10 is a schematic diagram showing a gas turbine combined electric generating plant adopting steam cooling for hot sections. In this gas turbine combined electric generating plant, thermal energy contained in the exhaust gas of the gas turbine is recovered by an HRSG (Heat Recovery Steam Generator) 370. Steam is generated by the thermal energy in the recovered exhaust gas of the gas turbine, and the high-temperature sand high-pressure steam is first supplied to a high pressure steam turbine 350 to drive it, to thereby generate power by the generator 355 coupled thereto.

The steam having worked in the high pressure steam turbine 350 is guided to a dynamic blade 321 through a steam supply pipe 311 provided in a turbine main spindle 310 of the gas turbine. Steam is also supplied to a stationary blade 325 from a steam supply port 330 provided outside of the casing of the gas turbine. A cooling flow passage is respectively provided in the dynamic blade 321 and the stationary blade 325, and the steam guided to the dynamic blade 321 and the stationary blade 325 absorbs heat of the combustion gas from the internal surface of the flow passage, while passing through this cooling flow passage, and is exhausted outside of the flow passage. Thereafter, the steam having cooled the dynamic blade 321 passes through a steam recovery pipe 312 provided in the turbine main spindle 310 and is taken out of the turbine, and the steam having cooled the stationary blade 325 is taken out of the turbine from a steam recovery port 331.

This cooling steam is guided to a mixing chamber 360 and mixed with the cooling steam having cooled the combustor tail pipe and the like, and the mixed steam is used as a working fluid for driving an intermediate pressure steam turbine 351 and a low pressure steam turbine 352. The steam having driven the intermediate pressure steam turbine 351 and the low pressure steam turbine 352 is recovered to water form by a steam condenser 365, and then supplied again to the HRSG 370 to repeat the above-described process.

In the gas turbine combined electric generating plant adopting the steam cooling system for hot members, hot members such as the dynamic blade and the stationary blade can be cooled effectively, and as a result, the temperature at the entrance of the turbine can be set high. Therefore, the thermal efficiency of the gas turbine is improved, and the thermal efficiency of the whole plant is also improved. However, in the gas turbine using the steam cooling system, it is necessary to change the coolant for the dynamic blade from the air to the steam, and to change the coolant for the stationary blade and the combustor tail pipe from the steam of the plant auxiliary steam generator to the steam of the HPSH (High Pressure Super Heater), during the period of from startup to rated operation. This is due to the following reasons.

The HRSG installed in the gas turbine combined electric generating plant has a large heat capacity, and hence it cannot generate the amount of steam necessary for driving the steam turbine and for using it as a coolant for the dynamic blade and the like for a while from the startup of the gas turbine. Therefore, it is necessary to use the steam supplied from a spare steam generator in the plant and the air in the gas turbine as the coolant until sufficient steam can be generated by the HRSG. When the HRSG can supply sufficient amount of steam, it is necessary to change the coolant for the hot members from the steam of the spare steam generator and the air in the gas turbine to the steam supplied from the HRSG.

For example, if the air for cooling the dynamic blade is changed at the same time when the gas turbine is connected with a generator, in some instances, a temperature distribution occurs in the gas turbine due to a density difference and a specific heat difference between the cooling air and the cooling steam, causing vibrations of the gas turbine, and thereby causing a trip (suspension) of the gas turbine. Therefore, to operate the gas turbine stably, the changeover of the coolant should be performed by finishing one operation and then executing the next operation by all means, and two or more operations are not performed at the same time. Hence, in the gas turbine combined electric generating plant using the steam cooling system, time is required from the startup to the rated operation of the gas turbine, whereby consumption of fuels and steam increases, causing a problem in that a starting loss increases. Further, if it is desired to obtain the rated output from a certain time, it is necessary to initiate the startup earlier, taking the time from the startup to the rated operation into consideration. As a result, extra personnel expenses for operating the plant are required.

SUMMARY OF THE INVENTION

It is an object of the invention to provide a gas turbine using steam cooling in which a shift from the startup of the gas turbine to the rated operation can be performed within a short period of time, an operation method of a gas turbine combined electric generating plant, and the gas turbine combined electric generating plant.

According to the method of one aspect of the present invention, a coolant for cooling hot members in the gas turbine is changed from casing air to steam the method comprises a step of measuring temperatures of the casing air and the steam and comparing the temperatures. A step of adjusting at least one of the temperatures of the casing air and the steam is carried out to equalize the temperature in the casing air and the temperature of the steam, and a step of changing the coolant for the hot members from the casing air to the steam during the connection period of the gas turbine with a generator is carried out, after having equalized the temperature in the casing air and the temperature of the steam.

Thus, the coolant for the hot members of the gas turbine, such as the dynamic blade and the turbine main spindle, is changed from the casing air to the steam during the connection period of the gas turbine with the generator. To do this, the changeover of the coolant is carried out after the temperature of the casing air and the temperature of the steam have been equalized. Conventionally, if the air for cooling the dynamic blade is changed while the gas turbine is connected to the generator, a temperature distribution occurs in the gas turbine due to a density difference and a specific heat difference between the cooling air and the cooling steam to cause vibrations of the gas turbine, thereby causing a trip (suspension) of the gas turbine. If such a trip of the gas turbine occurs in the actual electric generating plant, it becomes a big problem for the operation of the electric generating plant.

The spindle vibration of the turbine main spindle occurs because a temperature distribution occurs in the circumferential direction of the turbine main spindle, or a temperature distribution occurs in the circumferential direction of the rotor disk connected to the turbine main spindle. If the temperatures of the casing air and the steam to be changed are equalized, this temperature distribution becomes small, and the spindle vibration of the turbine main spindle can be suppressed within a tolerance. Therefore, even if the coolant is changed during the connection period of the gas turbine with the generator, since the spindle vibration of the turbine main spindle is within the tolerance, the trip of the gas turbine can be avoided. As a result, the time required from the startup to the rated operation of the gas turbine can be shortened, and hence the starting loss can be reduced. Further, with a program for allowing a computer to execute the operation method of the gas turbine, the operation method of the gas turbine can be realized by using a computer. Connection of the gas turbine with the generator means that the generator is connected to the gas turbine or the steam turbine, which have been heretofore singly operated.

Equalizing the temperatures of the casing air and the steam means that ideally the temperatures of the casing air and the steam become equal, but in the actual operation, if the temperature difference between these is not larger than 15° C., the spindle vibration of the turbine main spindle can be suppressed within the tolerance. However, the condition that the temperature difference is not larger than 15° C. is close to the tolerance limit of the spindle vibration. Therefore, to change over the coolant more stably, it is desired that the temperature difference between these be not larger than 12° C. to 13° C., and to allow for safety, it is desired that the temperature difference between these be not larger than 10° C. Further, the hot members of the gas turbine include the dynamic blade, the turbine main spindle, the rotor disk and the stationary blade, and in this invention, vibration due to unbalance of rotating systems attributable to the temperature distribution becomes a problem. Therefore, as the hot members in this invention, particularly the dynamic blade, the turbine main spindle or the rotor disk becomes the object (and so forth).

In the method according to another aspect of the present invention, when a coolant for cooling hot members in the gas turbine is changed from casing air to steam, the method comprises a step of measuring temperatures of the casing air and the steam and comparing the temperatures. A step of adjusting at least one of the temperatures of the casing air and the steam based on the comparison result equalizes the temperature in the casing air and the temperature of the steam. A step of changing the coolant for the hot members from the casing air to the steam which is generated by exhaust gas of the gas turbine is carried out when the load of the gas turbine increases to a level at which the gas turbine can generate sufficient steam for cooling hot members thereof by the exhaust gas.

This operation of the gas turbine is to change the coolant for the dynamic blade from the casing air to the steam at the time of partial load. When the coolant for hot members of the gas turbine, such as the dynamic blade and the turbine main spindle, is changed from the casing air to the steam, if the temperatures of the air and the steam are equalized, the spindle vibration is suppressed to a tolerance or below. In this manner, even if the coolant for the dynamic blade and the like is changed from the casing air to the steam at the time of partial load of the gas turbine, a trip of the gas turbine does not occur. Therefore, the coolant for the dynamic blade and the turbine main spindle can be changed in a state in which a load is applied to the gas turbine. As a result, the transition time from the startup to the rated load of the gas turbine can be shortened, and the starting loss can also be suppressed.

During the period for changing the medium for cooling the hot members of the gas turbine, such as the dynamic blade, it is not necessary to limit the load of the gas turbine, and at any time the temperatures of the casing air and the steam can be equalized. For example, the control for equalizing the temperatures of the casing air and the steam may be carried out before the connection of the gas turbine with the generator, or after shifting to the connection period thereof. Further, with the program for allowing a computer to execute the operation method of the gas turbine, the operation method of the gas turbine can be realized by using a computer.

In the method according to still another aspect of the present invention, a steam turbine is connected to a generator during the operation period before a rated load is applied to a gas turbine, and during the period when the steam supplied from outside of the gas turbine combined electric generating plant, for example from a plant steam generator or the like which cools a combustor, is changed to steam from a heat recovery steam generator provided in the gas turbine combined plant.

In this operation method of the gas turbine combined electric generating plant, when the coolant for the combustor is changed from the steam from the plant auxiliary steam generator or the like to the steam from the heat recovery steam generator which generates steam by exhaust gas of the gas turbine, the steam turbine is connected to the generator. Therefore, after the connection of the steam turbine with the generator, the steam for cooling the combustor can be changed without waiting for the output of the gas turbine to become stable. Hence the time required for the rated operation can be shortened, and the starting loss can be reduced. Further, with the program for allowing a computer to execute the operation method of the gas turbine combined electric generating plant, the operation method of the gas turbine can be realized by using a computer. The combustor in this invention also includes the combustor tail pipe in addition to the combustor itself.

In a method according to still another aspect of the present invention, the load of the gas turbine is increased during the period when the steam supplied for cooling a stationary blade for a certain period from the startup of the gas turbine is changed from auxiliary steam generated by using, as a heat source, other than the exhaust gas of a gas turbine, such as an auxiliary steam generator and the like, to the steam generated by a heat recovery steam generator which generates steam by exhaust gas of the gas turbine.

In this operation method of the gas turbine combined electric generating plant, the period for changing the coolant for the stationary blade from the steam of the plant auxiliary steam generator or the like to the steam of the HRSG is overlapped on the period for increasing the load of the gas turbine from the partial load to the rated load. It has been heretofore considered that if a coolant having a temperature difference and a density difference is changed, a temperature distribution occurs in the gas turbine, thereby causing a problem in the operation of the gas turbine. Therefore, after one operation has been finished, and the subsequent condition becomes stable, the next operation is carried out.

However, this problem is a problem in the rotation system such as the dynamic blade and the turbine main spindle, and hence, even if the coolant having a slight temperature difference and density difference for the stationary blade, the combustor or the combustor tail pipe, being the stationary system, is changed, the rotation system is hardly affected. Therefore, even if the steam for cooling the stationary blade is changed, with an increase of the load of the gas turbine, a trip of the gas turbine does not occur. As a result, the time required for the rated load operation can be shortened, and the starting loss can be reduced. Further, with a program for allowing a computer to execute the operation method of the gas turbine combined electric generating plant, the operation method of the gas turbine can be realized by using a computer.

A gas turbine combined electric generating plant according to still another aspect of the present invention has a gas turbine connected to a generator to generate power. A dynamic blade, a stationary blade, a combustor, a combustor tail pipe and other hot sections are cooled with air or steam. A heat recovery steam generator recovers exhaust heat from the gas turbine to generate steam by the heat recovered therefrom. A temperature adjusting unit, when a coolant for the hot members is changed from the casing air to the steam from the heat recovery steam generator, controls so as to equalize the temperatures of the air and the steam. A control unit changes the coolant for the hot sections from the casing air to the steam generated by the heat recovery steam generator during the connection period of the gas turbine with the generator.

This gas turbine combined electric generating plant has such a configuration that when the coolant for the dynamic blade and the like is to be changed from the casing air to the steam, after the temperatures of the casing air and the steam are equalized, changeover is carried out during the connection period of the gas turbine with the generator. Therefore, the spindle vibration of the turbine main spindle can be suppressed to a tolerance or below, and trip of the gas turbine can be avoided. As a result, the time required from startup to the rated operation of the gas turbine can be shortened, and hence the starting loss can be reduced. Since the time required from the startup to the rated operation of the gas turbine is short, personnel expenses for the operator can be also suppressed. If the startup initiation time of the gas turbine is the same, stable operation can be performed for a longer period of time, as compared with the conventional operation method. Further, since a long period of time is not required for reaching stable operation, even when operation and suspension are repeated often, a constant output can be obtained quickly. Therefore, the demands for electric power can be dealt with in a more detailed manner than before.

These and other objects, features and advantages of the present invention are specifically set forth in or will become apparent from the following detailed description of the invention when read in conjunction with the accompanying drawings.

DETAILED DESCRIPTIONS

This invention is explained in detail, with reference to the drawings, but this invention is not limited by those embodiments. The components in the following embodiments should include components that are easily assumed by those skilled in the art.

Figure 1:
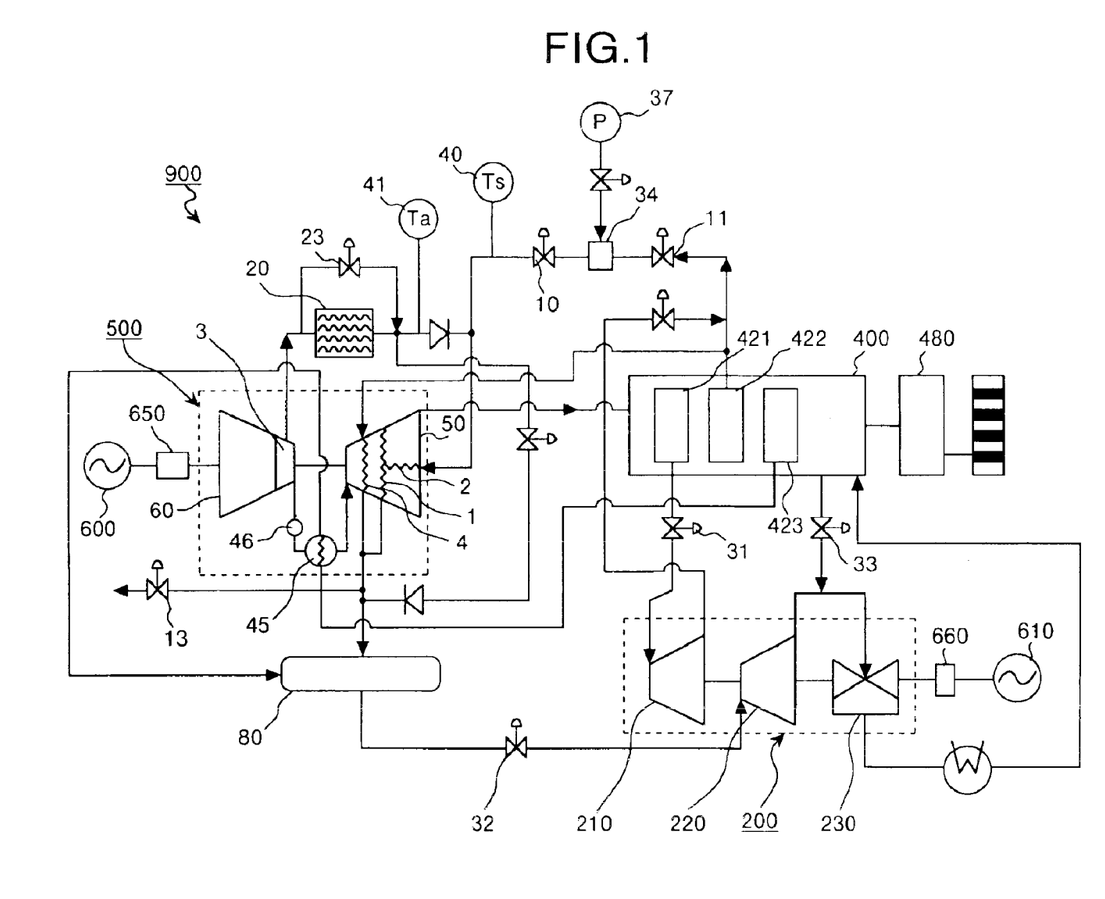
FIG. 1 is an explanatory diagram which shows a gas turbine combined electric generating plant according to this invention.

FIG. 1 is an explanatory diagram which shows a gas turbine combined electric generating plant according to this invention. This gas turbine combined electric generating plant 900 comprises a gas turbine 500 and a generator 600 connected thereto, a steam turbine 200 and a generator 610 connected thereto, and an HRSG (heat recovery steam generator) 400 which generates steam by the exhaust gas of the gas turbine.

The gas turbine 500 comprises a compressor 60, a combustor 46 and a turbine 50, and high-temperature and high-pressure air compressed by the compressor 60 is guided to the combustor 46. The combustor 46 injects a gas fuel such as a natural gas or a liquid fuel such as a light fuel oil or a light heavy fuel oil to the high-temperature and high-pressure air to burn the fuel to thereby generate a high-temperature combustion gas. This combustion gas is injected to the turbine 50 through a combustor tail pipe 45, and the turbine 50 converts the thermal energy contained in the high-temperature and high-pressure combustion gas into rotational energy. The compressor 60 is driven by this rotational energy, and the remaining rotational energy left after having driven the compressor 60 drives the generator 600 to thereby generate power.

When the gas turbine 500 is activated, the generator 600 is rotated as a motor to start the gas turbine, and the gas turbine 500 is separated from the generator 600 by a clutch unit 650 for the gas turbine. The number of revolution is gradually increased, and the gas turbine 500 reaches the constant-velocity operation at a rated number of revolution (3000 or 3600 rpm), to warm up a dynamic blade 1, a turbine main spindle 2 and the like by the casing air extracted from a casing 3. After the warm-up has been finished, a coolant for the dynamic blade 1 is changed from the casing air to steam from a High Pressure-Super Heater (HP-SH) 422 during the connection period of the gas turbine 500 with the generator. At this time, the temperatures of the casing air and the steam are equalized, more specifically, after a temperature difference between the casing air and the steam is adjusted to 10° C. or below, the changeover is carried out. This is described later in detail.

The combustion gas having driven the turbine 50 is guided to the HRSG 400 for recovering the thermal energy therein. Here, since the HRSG 400 generates steam by the exhaust gas of the gas turbine 500, if the temperature of the exhaust gas of the gas turbine 500 is not sufficiently high, steam for driving the steam turbine 200 cannot be generated. To give a quantity of heat to the HRSG 400, which can generate the steam sufficient for driving the steam turbine 200, it is necessary that load of about 20 to 30% of the rated load is applied to the gas turbine 500. If the exhaust gas of the gas turbine 500 in this condition is provided to the HRSG 400, the HRSG 400 can generate steam sufficient for driving the steam turbine 200. Therefore, after connecting the gas turbine 500 to the generator, the steam turbine 200 is activated, with the gas turbine 500 being driven in the condition of being applied with a certain load (20 to 30% of the rated load).

Under the above load condition, the HRSG 400 can generate steam sufficient for driving the steam turbine 200. Therefore, the steam generated by the HRSG 400 is supplied to a high pressure steam turbine 210 and an intermediate pressure steam turbine 220 in the steam turbine 200, by opening a high pressure steam valve 31, an intermediate pressure governor valve (IP-GV) 32 and the like. When the steam turbine 200 is driven to increase the speed up to a certain number of revolutions (3000 or 3600 rpm), the steam turbine 200 is connected to the generator. At this time, a clutch unit 660 for the steam turbine is operated to connect the generator 610 and the stream turbine 200. Thereafter, the steam for cooling the dynamic blade 1, the combustor tail pipe 45 or the combustor 46 is sequentially changed to the exhausted steam from the high pressure steam turbine 210. After the changeover is finished, the load of the gas turbine 500 and the steam turbine 200 is increased to enter into the rated load operation.

As described above, in the gas turbine combined electric generating plant 900, since the exhaust heat of the gas turbine 500 is recovered by the HRSG 400, the thermal energy contained in the combustion gas can be efficiently recovered. Further, since steams having various temperature levels are generated by the HRSG 400, the high pressure steam turbine 210 and the like, the steam having the most suitable temperature level can be used as a medium for cooling the dynamic blade 1, the combustor tail pipe 45 or the combustor 46 in the gas turbine 500. Therefore, the temperature adjustment of the cooling steam can be the necessary minimum, whereby extra energy is not consumed for temperature adjustment and the thermal efficiency of the whole plant can be increased. Since the gas turbine combined electric generating plant 900 adopts the operation method explained below, the period from startup to the rated load operation of the gas turbine can be shortened. As a result, the starting loss can be decreased, thereby enabling economical operation.

Figure 2:
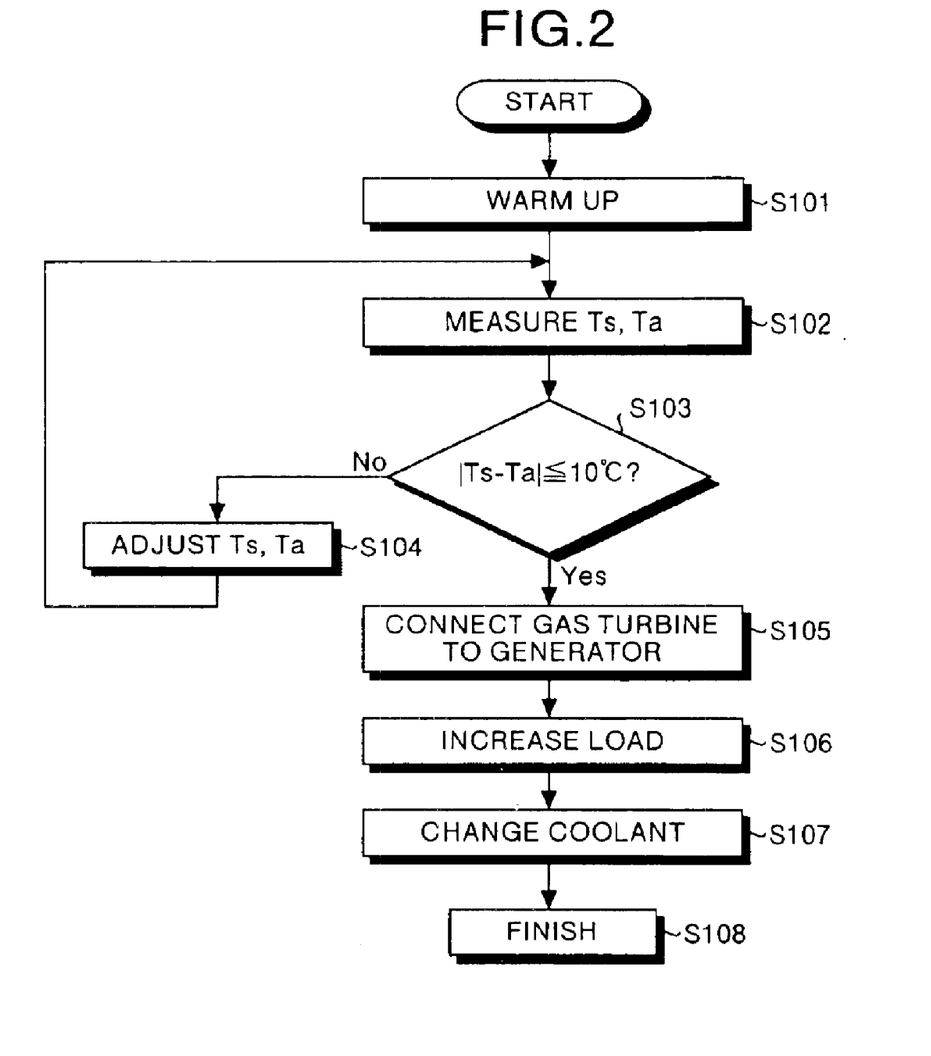
FIG. 2 is a flowchart which shows the operation method of gas turbines according to a first embodiment of this invention.
Figure 3:
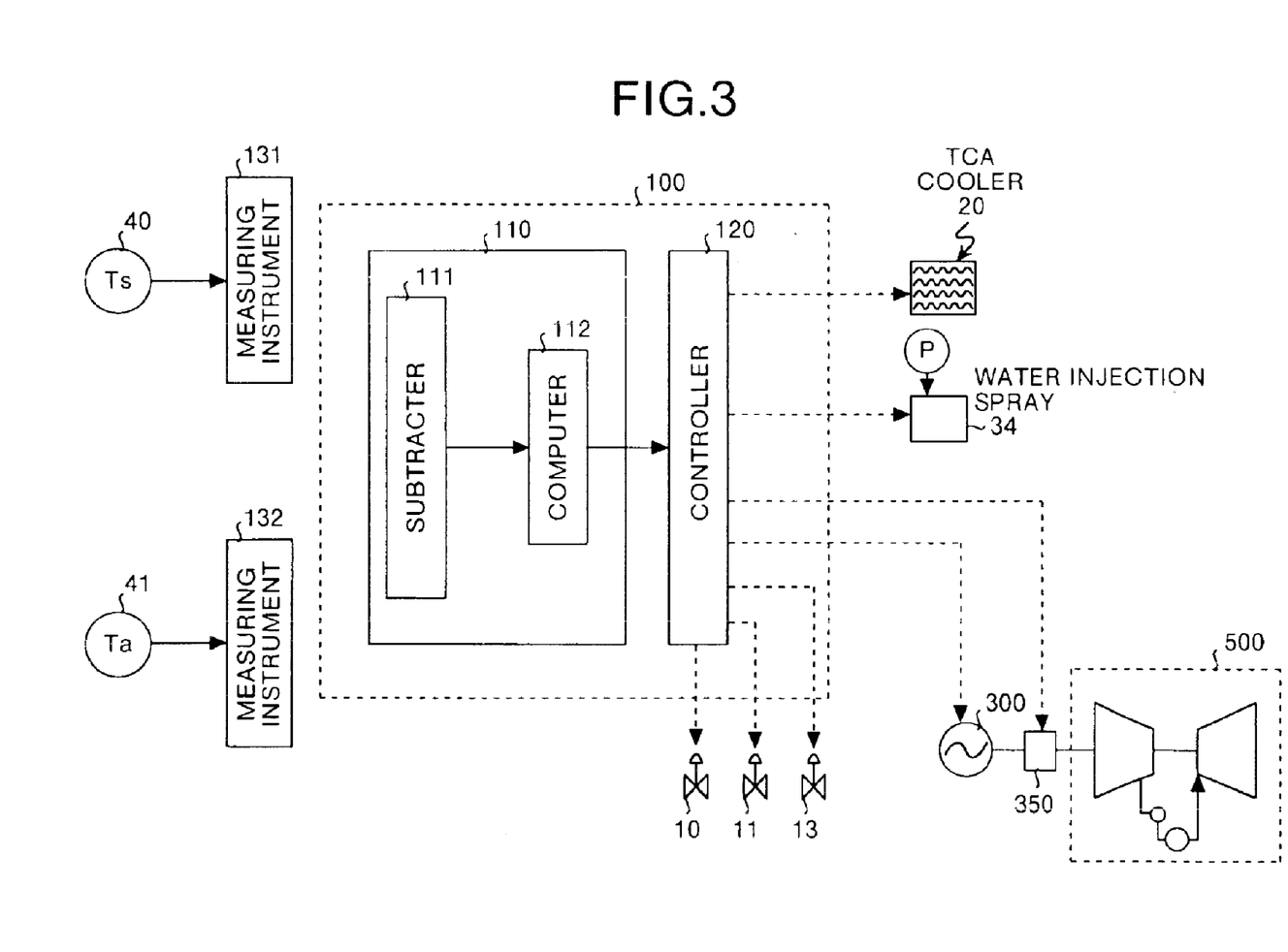
FIG. 3 is an explanatory diagram which shows a control unit which can be applied to this operation method.

FIG. 2 is a flowchart which shows the operation method of gas turbines according to a first embodiment of this invention. FIG. 3 is an explanatory diagram which shows a control unit which can be applied to this operation method. This operation method has a feature in that the cooling air used for cooling the dynamic blade and the like is changed to the backup steam during the connection period of the gas turbine with the generator. At first, the gas turbine is activated to initiate the operation of the gas turbine, and the speed thereof is increased to the rated speed (3000 or 3600 rpm). When the rotation of the gas turbine is increased to the rated speed, the gas turbine enters into constant-speed operation.

At the stage of constant-speed operation immediately after the startup of the gas turbine, since sufficient steam is not generated from the HRSG, the air in the casing of the gas turbine is used for cooling the dynamic blade, to warm up the dynamic blade, the turbine main spindle, the rotor disk or the stationary blade (step S101). When sufficient steam is generated from the HRSG, the coolant for the dynamic blade and the like is changed from the air to steam during the connection period of the gas turbine with the generator. However, prior to this operation, it is necessary to equalize the temperature of the casing air which has cooled the dynamic blade and the like and the temperature of the backup steam from the HP-SH 422 provided in the HRSG 400 (see FIG. 1). This is due to the following reasons.

If a temperature difference between the casing air used as the cooling air and the steam is large, a thermal expansion or contraction occurs in the rotation system such as the rotor disk or the turbine main spindle. Particularly, when the temperature distribution in the circumferential direction which occurs in the turbine main spindle becomes large, the spindle vibration increases and exceeds the tolerance. Therefore, the operation of the gas turbine cannot be continued, and it is tripped (suspended). Here, if the temperature of the casing air and the steam temperature are equalized, the vibration of the turbine main spindle can be suppressed to within the tolerance, and spindle vibration that causes trip of the gas turbine does not occur. As a result, desirably, it is necessary to equalize the temperatures of the air and the steam to suppress the spindle vibration so as not to cause a trip of the gas turbine.

The degree of equalization of the temperature of the casing air and the steam temperature is desirably such that the temperatures of the casing air and the steam become the same, ideally. However, at least, if the temperature difference between these is not larger than 15° C., the spindle vibration can be suppressed within the tolerance. However, the condition that the temperature difference is not larger than 15° C. is close to the tolerance limit of the spindle vibration. Therefore, to change over the coolant more stably, it is desired that the temperature difference between these be not larger than 12° C. to 13° C., and to allow for safety, it is desired that the temperature difference between these be not larger than 10° C.

To equalize the casing air temperature Ta and the steam temperature Ts, both temperatures are first measured (step S102) to take a difference between these as a step of comparing the temperatures. If the absolute value ΔT is within a predetermined temperature (10° C., herein) (step S103), the gas turbine is connected to the generator (step S105). When ΔT is larger than 10° C., at least one of the casing air temperature Ta and the steam temperature Ts is adjusted, for example, by the method explained below, to equalize the temperatures of these (step S104).

To equalize the casing air temperature Ta and the steam temperature Ts, a water injection spray 34 (see FIG. 1) for decreasing the temperature of the high pressure steam by injecting water to the high pressure steam is provided between the dynamic blade 321 and the HP-SH 422. A high pressure feed water pump 37 is connected to this water injection spray 34 to inject water to the high pressure steam supplied from the HP-SH 422. The water injected to the high pressure steam becomes minute particles and diffuses in the high pressure steam, and hence the temperature of the high pressure steam can be quickly dropped. Therefore, the steam temperature and the casing air temperature can be equalized quickly.

Figure 4A:
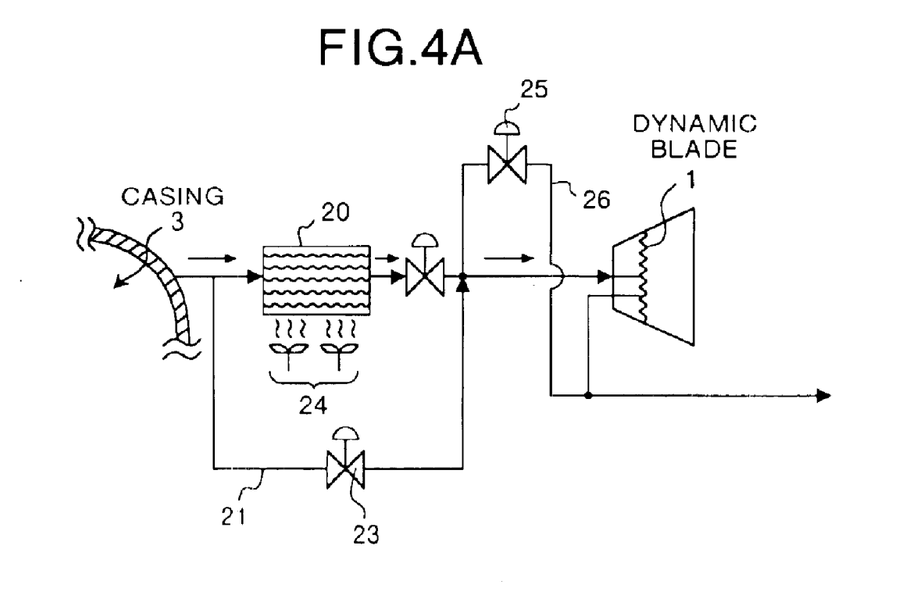
FIG. 4A and FIG. 4B are explanatory diagrams which show an adjustment unit of the casing air temperature.
Figure 4B:
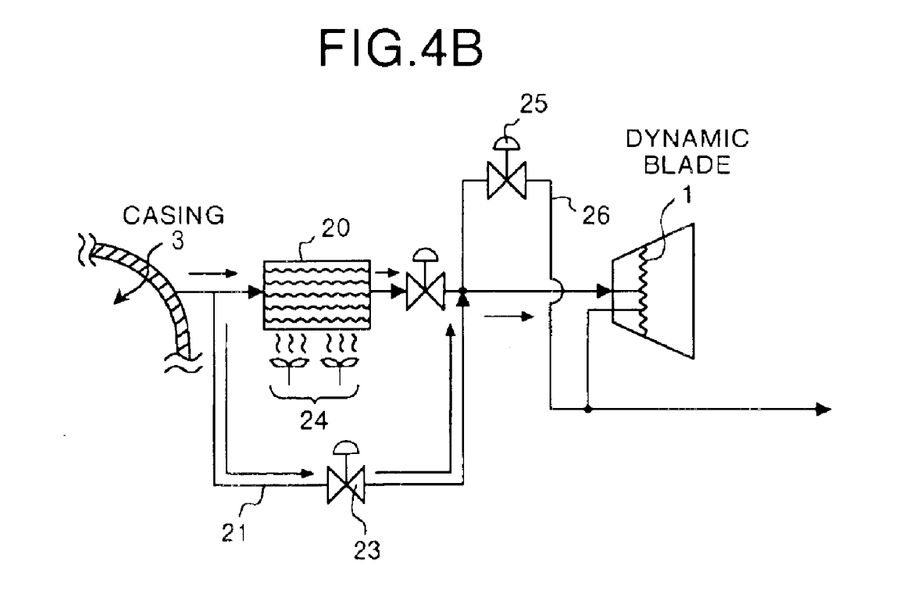

It is also possible to adjust the casing air temperature to suppress the temperature difference between the steam temperature and casing air temperature within 10° C. FIG. 4A and FIG. 4B are explanatory diagrams which show an adjustment unit of the casing air temperature. As shown in this figure, the temperature of the casing air can be adjusted by changing the amount of air cooled by a cooler 20 by a flow regulating valve 23, or by changing the number of fans 24 to be operated or changing the number of revolutions of the fans 24.

The steam temperature Ts and the casing air temperature Ta are measured by thermometers 40 and 41 (step S102). This measurement result is taken into measuring instruments 131 and 132 and converted into electric signals. These electric signals are A/D converted by the measuring instruments 131 and 132 and sent to a control unit 100, and a difference between these is calculated by a subtracter 111 in a processor 110 provided in the control unit 100. For example, if the absolute value of this difference, ΔT=|Ta−Ts|, is within 10° C., continuously for a predetermined number of times (here, 10 times), it is judged that the difference between the casing air temperature Ta and the steam temperature Ts is within 10° C. A control signal for connection of the gas turbine is then transmitted from a computer 112 provided in the processor 110 to a controller 120, which is a control section, to connect the gas turbine with the generator. If not, the temperatures of these are adjusted to suppress the temperature difference between these within 10° C. This adjustment method is described below.

When the absolute value ΔT of the difference is not within 10° C., a control signal for temperature adjustment is sent from the computer 112 to the controller 120. The controller 120 operates the cooler 20 or the water injection spray 34 to adjust Ta or Ts so that ΔT comes within 10° C. (step S104). At this time, it can be calculated, from the specific heat of the casing air or the cooling steam how much the temperature can be decreased by bypassing how much air or by injecting how much water. Therefore, if this calculation value is used together with the feedback of the temperature, ΔT can be suppressed within the predetermined temperature range more quickly. The cooler 20 and the water injection spray 34 may be operated at the same time, or only one of these may be operated, so as to suppress ΔT to 10° C. or below.

To increase the steam temperature, it is necessary to increase the thermal energy input to the HRSG 400, but since the HRSG 400 has a large heat capacity, it is difficult to increase the steam temperature in a short period of time. Therefore, if the casing air temperature Ta is higher than the steam temperature Ts, the temperature of the cooling air is decreased by increasing the temperature of the air which passes through the cooler 20 or the like to thereby suppress ΔT to 10° C. or below. On the other hand, if the steam temperature Ts is higher than the casing air temperature Ta, the amount of cooling air which passes through the TCA cooler 20 is decreased to thereby increase the casing air temperature Ta while decreasing the steam temperature Ts by injecting water to the steam by the water injection spray 34. In this manner, the casing air temperature Ta and the steam temperature Ts approach each other, and hence ΔT can be suppressed to 10° C. or below in a shorter period of time.

When the difference between the casing air temperature Ta and the steam temperature Ts is suppressed to 10° C. or below, a control signal for the connection of the gas turbine is transmitted from the computer 112 in the processor 110 to the controller 120 to connect the gas turbine with the generator (step S105). In response to this control signal, the controller 120 first activates the generator 600, to synchronize the number of revolutions of the generator 600 with the number of revolutions of the gas turbine 500. This is because if the stationary generator 600 is connected to the gas turbine 500 which is rotating at a high speed, the clutch unit 650 for the gas turbine and the turbine shaft (not shown) are damaged.

After the number of revolutions of the gas turbine 500 is synchronized with that of the generator 600, the processor 110 sends a clutch connection signal to the controller 120 so that the controller 120 actuates the clutch unit 650 for the gas turbine to connect the gas turbine 500 and the generator 600, whereby connection is completed. When the connection of the gas turbine with the generator is completed, the load is gradually increased (step S106), and at the same time, the processor 110 sends a coolant changeover signal to the controller 120. The coolant may be changed after the connection has been completed, or at the same time with the connection. A dynamic blade steam control valve 10, a pressure control valve 11 and an exhaust valve 13 are then controlled, and the coolant is changed to the steam (step S107), thereby completing the connection of the gas turbine 500 with the generator and the changeover of the coolant (step S108).

Conventionally, if the coolant for the dynamic blade or the like is changed while increasing the load, during the connection period of the gas turbine or after the connection has been completed, a thermal expansion or contraction which causes vibrations in the rotation system occurs in the condition with the load being applied, thereby causing a trip of the gas turbine. Therefore, after the changeover of the coolant has been finished and the temperature distribution of the rotation system becomes stable, the gas turbine is connected to the generator. As a result, a long period of time is required for entering into the rated load operation, and hence it is necessary to activate the gas turbine at an earlier stage to operate the plant as per the schedule. Further, as a result of continuous operation until the rated load operation is achieved, expensive cooling steam is used redundantly, or fuel is consumed redundantly, thereby causing a cost increase of the operation expenses, and a so-called starting loss increases.

However, with the operation method of the gas turbine according to the first embodiment, at the time of connection of the gas turbine and changeover of the coolant, the temperature difference between the casing air and the steam is adjusted within 10° C. Therefore, vibration or the like of the turbine main spindle is suppressed to within a tolerance, and hence even during the connection period of the gas turbine with the generator, a trip thereof does not occur. The coolant can be changed from the air to the backup steam during the connection period of the gas turbine with the generator, and hence the time until the rated load operation is achieved can be shortened considerably. As a result, the consumption of the cooling steam and the fuel, that is, the starting loss, can be reduced, and the personnel expenses for the operator can also be suppressed. If the startup initiation time of the gas turbine is the same, the rated load operation can be performed for a longer period of time as compared with the conventional operation method. Further, since a long period of time is not required for reaching the rated load operation, even when operation and suspension are repeated often, the rated load output can be obtained quickly. Therefore, the demands for electric power can be dealt with in a detailed manner than before.

The processor 110 may be realized by special-purpose hardware, or the processor 110 may be constituted of a memory and a CPU (central processing unit), and serves its function by loading a program (not shown) for realizing the function of the processor 110 to the memory and executing the program (and so forth). The control unit 100 may be connected to an input unit, a display unit and the like (not shown) as peripheral equipment.

Figure 5:
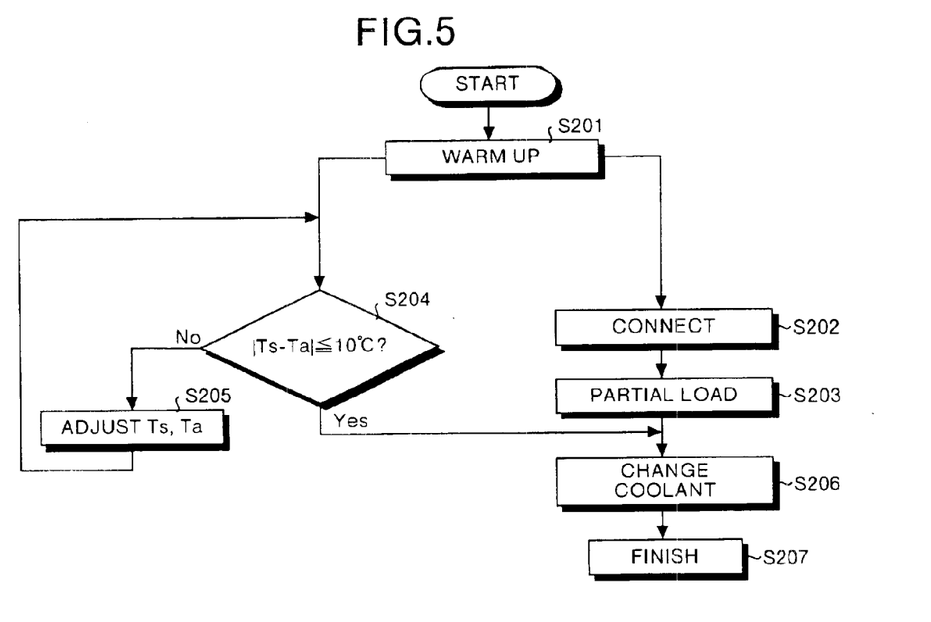
FIG. 5 is a flowchart which shows the operation method of a combined cycle according to a modified example of the first embodiment.

FIG. 5 is a flowchart which shows the operation method of a gas turbine according to a modified example of the first embodiment. This operation method has a feature in that the cooling air having been used for cooling the dynamic blade and the like is changed to the backup steam at the time of part-load operation, after the gas turbine has been connected to the generator. With the operation method of a combined cycle according to the first embodiment, the cooling air is changed to the backup steam during the connection period of the gas turbine with the generator, but this changeover may be carried out at the time of the partial load of the gas turbine, as shown in this modified example.

Figure 6A:
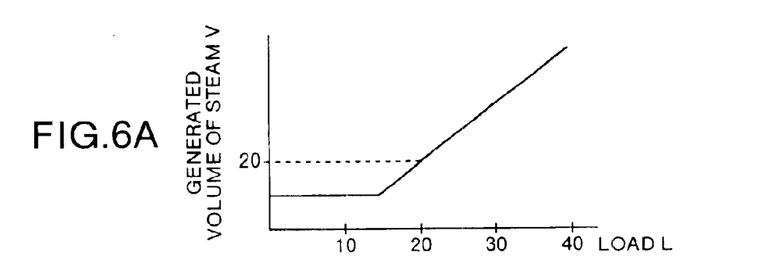
FIG. 6A and FIG. 6B are explanatory diagrams which show the relation between the load of the gas turbine and the quantity of heat of the exhaust gas and the generated volume of steam of the gas turbine.
Figure 6B:
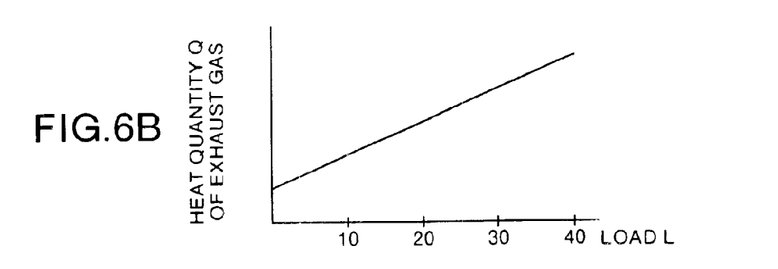

The meaning of the partial load is explained here. FIG. 6A and FIG. 6B are explanatory diagrams which show the relation between the load of the gas turbine and the quantity of heat of the exhaust gas from the gas turbine and the generated volume of steam. FIG. 6A shows the relation between the load of the gas turbine and the volume of steam generated per hour. Here, the load plotted on the X axis shows the ratio when the rated load is assumed to be 100%. The generated volume of steam V plotted on the Y axis shows the ratio when the volume of steam generated per hour by the HRSG when the gas turbine is operated at the rated load, assumed to be 100%. The Y axis in FIG. 6B shows the quantity of heat Q of the exhaust gas from the gas turbine, and is expressed by a ratio of the quantity of heat Q of the exhaust gas when the gas turbine is operated at the rated load, which is assumed to be 100%.

Before changing the coolant to the steam, hot sections such as the dynamic blade and the like are cooled by the casing air. On the other hand, the steam after the coolant has been changed is generated by recovering the thermal energy contained in the exhaust gas of the gas turbine itself by the HRSG. When the cooling air is to be changed to the cooling steam, it is necessary that the volume of steam necessary for cooling the hot sections such as the dynamic blade is generated by the HRSG from the exhaust gas of the gas turbine itself.

Purely taking the energy balance only into consideration, for example, even when the load of the gas turbine is about 15% in FIG. 6A, the necessary volume of steam can be obtained, if taking time. However, this means that it takes time to activate the electric generating plant, and the starting loss increases. Actually, to provide the volume of steam necessary for cooling within a short period of time from activation, it is necessary to apply a load to the gas turbine, which is larger than that of purely taking the energy balance into consideration. The load at this time is the partial load, and though depending on the plant, it is necessary that the volume of steam V generated per hour by the HRSG is 20% or more of the volume of steam at the time of the rated load, and from FIG. 6B, the load at this time becomes 20% or more of the rated load. The operation method according to this modified example is explained with reference to FIG. 5.

The gas turbine is activated, and after the dynamic blade and the turbine main spindle are warmed up by the casing air, when the difference between the casing air temperature Ta and the steam temperature Ts becomes within 10° C. (step S201), the gas turbine is connected to the generator (step S202). The load of the gas turbine is then increased up to the partial load condition (step S203). On the other hand, it is judged whether the absolute value ΔT of the temperature difference between the steam temperature Ts and the casing air temperature Ta is within 10° C. (step S204). If ΔT is larger than 10° C., adjustment is carried out using the TCA cooler 20 and the water injection spray 34, so that ΔT decreases to 10° C. or below (step S205). At the time of partial load, when ΔT becomes 10° C. or below, a coolant changeover signal is sent from the processor 110 (see FIG. 3) to the controller 120 in the control unit 100, to thereby control the dynamic blade steam control valve 10, the pressure control valve 11 and the exhaust valve 13 (see FIG. 1), and the coolant is changed to the steam (step S206), thereby completing the changeover of the coolant (step S207).

At the time of changeover of the coolant for the dynamic blade or the like, the reason why it is necessary to equalize the casing air temperature and the steam team is similar to the above-described example. The control in the above example is also applicable to the control at that time. In the operation method of the gas turbine according to this modified example, since the coolant is changed from the air to the cooling steam at the time of partial load, the time shifting from the startup to the rated load of the gas turbine can be shortened. As a result, the starting loss can be reduced, thereby enabling economical operation.

Figure 7A:
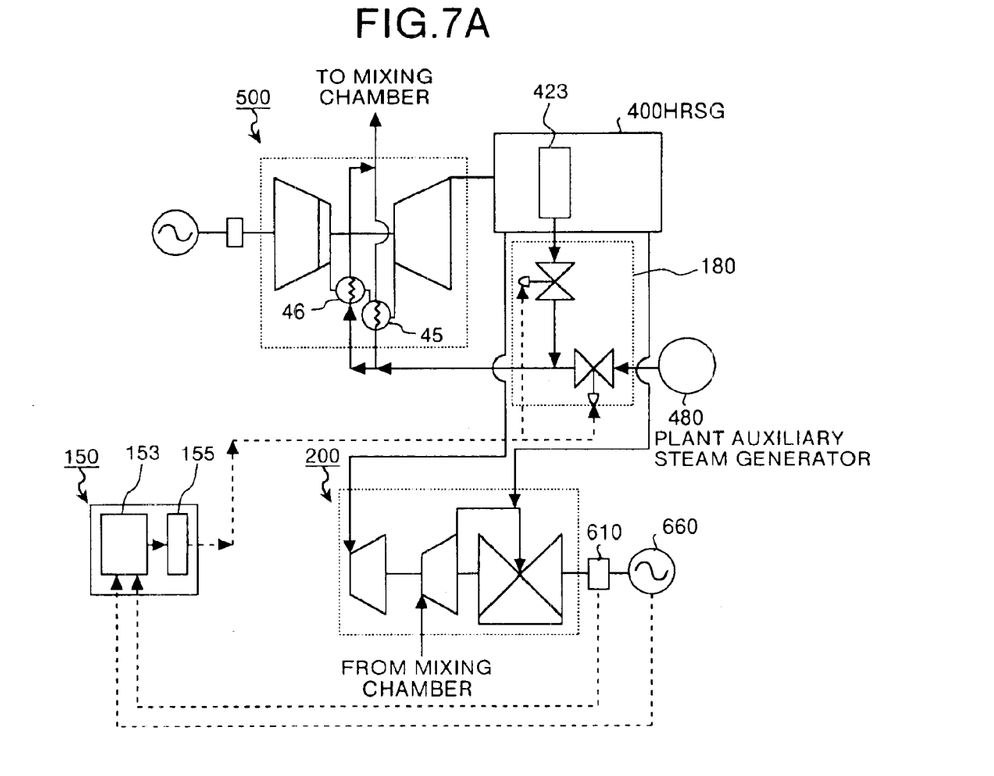
FIG. 7A and FIG. 7B are explanatory diagrams which show the operation method of the gas turbine according to a modified example, being the second embodiment.
Figure 7B:
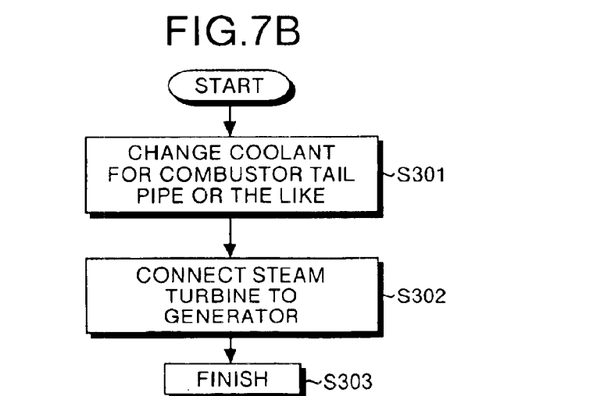

FIG. 7A and FIG. 7B are explanatory diagrams which show the operation method of the gas turbine according to a modified example of the second embodiment. This operation method has a feature in that during the period of changing the coolant for the combustor tail pipe, the steam turbine is connected to the generator. As shown in FIG. 7A and FIG. 7B, the coolant for the combustor tail pipe 45 and the combustor 46 is changed from the steam of a plant auxiliary steam generator 480 to the steam of an IP-SH (Intermediate Pressure-Super Heater) 423 provided in the HRSG 400 (step S301). At this time, in response to the changeover signal from a processor 153 provided in a control unit 150, a controller 155 changes over a selector valve 180 from the plant steam side to the IP-SH 423 side. This selector valve 180 is formed by combining necessary valves. The changeover signal may be issued at the same time with the connection of the steam turbine 200 with the generator, or the timing for issuing the changeover signal may be shifted.

The processor 153 then sends a steam turbine connection signal to the controller 155 (step S302). The controller 155 then activates the generator 610 to synchronize it with the steam turbine 200. When the rotations of these are synchronized, the processor 153 issues a connection signal of the clutch for the steam turbine to the controller 155, and the controller 155 operates a clutch unit 660 for the steam turbine. A generator 610 and the steam turbine 200 are then connected, to thereby complete the connection of the steam turbine 200 (step S303).

When the steam turbine 200 is connected to the generator, the load applied to the steam turbine 200 increases, and more steam is consumed than that of before the connection. Hence the amount of consumption of the steam of the HRSG 400 also increases. Therefore, if the changeover of the coolant for the combustor and the combustor tail pipe is carried out at the same time with the connection of the steam turbine 200, the amount of consumption of the steam of the HRSG 400 increases further. To generate more steam, the load of the gas turbine 500 increases. As a result, it is considered that the stability of the whole plant decreases. Therefore, it has been heretofore considered that it is not possible to carry out the connection of the steam turbine 200 with the generator and the changeover of the steam for cooling the combustor tail pipe at the same time.

However, since the HRSG 400 has a large heat capacity, the load of the gas turbine 500 hardly affects the load fluctuation of the HRSG 400. Hence, it is found that even if the steam turbine 200 is connected to the generator during the changeover period of the steam for cooling the combustor and the combustor tail pipe, the influence on the stability of the whole electric generating plant is small. When the coolant for the combustor tail pipe 45 and the combustor 46 is changed, it is desired to equalize the steam temperature from the plant auxiliary steam generator 480 and the steam temperature from the IP-SH 423 as much as possible. If the temperature difference between these steams is too big, the combustor tail pipe 45 may be damaged due to a thermal shock or the like.

According to the operation method of the gas turbine according to the second embodiment, the steam turbine can be connected to the generator at the same time with the period when the steam for cooling the combustor and the combustor tail pipe in the gas turbine is changed. As a result, since the steam turbine can be connected to the generator, while changing over the steam for cooling the combustor and the combustor tail pipe, the time required for reaching the rated operation can be shortened, and the starting loss can be also reduced.

Figure 8A:
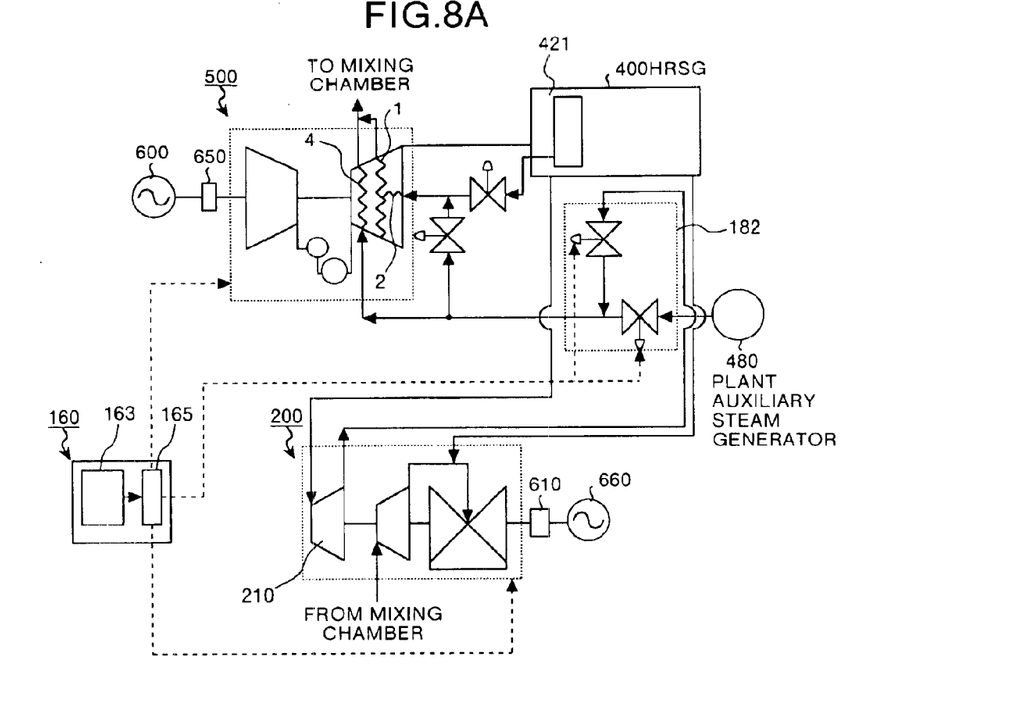
FIGS. 8A–8C are explanatory diagrams which show one example of the operation method of a combined cycle according to a third embodiment of this invention.
Figure 8B:
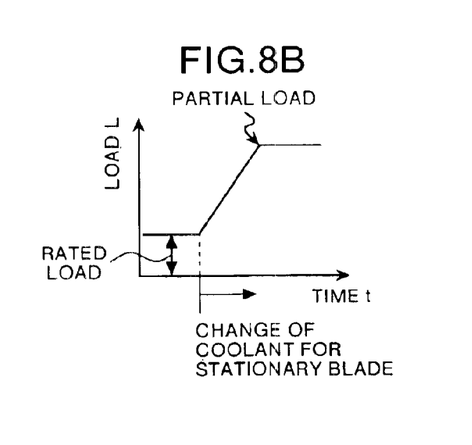
Figure 8C:
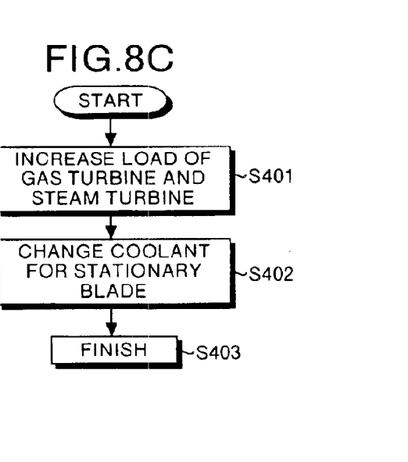

FIGS. 8A–8C are explanatory diagrams which show one example of the operation method of a combined cycle according to a third embodiment of this invention. This operation method has a feature in that the time for changing the coolant for the stationary blade from the steam from the plant auxiliary steam generator to the exhaust steam from the high pressure turbine is overlapped on the time when the load of the gas turbine is increased to the rated load. As shown in FIG. 8C, while the load of the gas turbine 500 and the steam turbine 200 is increased to the rated load, the steam for cooling the stationary blade 4 is changed from the steam from the plant auxiliary steam generator 480 to the exhaust steam from the high pressure steam turbine 210.

It is explained with reference to FIG. 8A and FIG. 8C. At first, a load increase signal is issued from a processor 163 in a control unit 160 to a controller 165, whereby the controller 165 allows the load of the gas turbine 500 and the steam turbine 200 to be increased to the rated load (step S401). Specifically, the load is increased by increasing the fuel and the air supplied to the gas turbine 500 or by increasing the volume of steam supplied to the steam turbine 200. A coolant changeover signal for a stationary blade 4 is then issued from the processor 163 to the controller 165 (step S402), at the same time with the transmission of the load increase signal, or while increasing the load. The controller 165 receives this signal and operates a selector valve 182 to change over the steam for cooling the stationary blade 4 from the steam of the plant auxiliary steam generator to the exhaust steam from the high pressure steam turbine. As a result, changeover of the coolant for the stationary blade 4 is completed (step S403). This selector valve 182 is formed by combining necessary valves.

When a coolant having a different temperature is made to flow in the hot members, such as the dynamic blade of the gas turbine, a problem occurs in the gas turbine due to the thermal expansion or the like, and there is a possibility of causing a trip. Therefore, it has been heretofore considered that changeover of the cooling steam cannot be carried out while increasing the load. However, it is mainly the rotation system of the gas turbine, such as the dynamic blade, the turbine main spindle or the rotor disk that causes a problem due to a density difference, a temperature difference or a specific heat difference of the coolant. Hence, even if the coolant for the stationary blade 4 installed in the stationary system is changed, it does not directly affect the rotation system. Therefore, incompatibility that causes a trouble in the operation does not occur except when the temperature difference of the coolant to be changed is extremely large. If the temperature difference of the coolant to be changed is extremely large, there is a possibility that trouble is caused in the stationary blade 4 due to a thermal shock or the like, and hence it is desired to suppress this temperature difference. In the operation method of the gas turbine, since the cooling steam for the stationary blade can be changed with an increase of the load, the time required for the rated operation can be shortened, and the starting loss can be also reduced.

In the third embodiment, the steam for cooling the stationary blade is changed from the plant steam to the exhaust steam from the high pressure steam turbine, but at the same time, the steam for cooling the dynamic blade 1 may be changed from the backup steam of a high pressure super heater 421 to the exhaust steam from the high pressure steam turbine 210. At this time, since the coolant for the rotation system, such as the dynamic blade 1 and the turbine main spindle 2, is changed, if the temperature difference of the coolant is large before and after the changeover, spindle vibrations occur, causing a trip of the gas turbine 500. Therefore, it is necessary to control so that the temperature of the steam from the high pressure super heater 421 and the exhaust steam from the high pressure steam turbine 210 are equalized. By performing such a control, the spindle vibration can be suppressed within the tolerance, and a trip of the gas turbine can be prevented. For the control of equalizing the temperatures at this time, the control method explained in the first embodiment can be applied. As described above, with this operation method, since the steam for cooling the dynamic blade can be changed, with an increase of the load of the gas turbine, the time required for the rated load operation can be shortened, and the starting loss can be also reduced.

Even if the control method according to the first to third embodiments is used alone, the action for shortening the time required from the startup to the rated load operation of the gas turbine can be obtained. However, if two or more of the above operation methods are combined, the time required from the startup to the rated load operation of the gas turbine can be further shortened, and hence the starting loss can be further reduced.

As explained above, with the operation method of gas turbines according to this invention, the coolant for the hot members of the gas turbine, such as the dynamic blade and the turbine main spindle, is changed from the casing air to the steam, during the connection period of the gas turbine with the generator. To realize this changeover, after the casing air temperature and the steam temperature have been equalized, the changeover of the coolant is carried out. Therefore, at the time of changeover of the coolant, the temperature distribution in the circumferential direction occurring in the turbine main spindle and the rotor disk can be made small, and hence the spindle vibration of the turbine main spindle can be suppressed within the tolerance. Therefore, even if the coolant is changed during the connection period of the gas turbine with the generator, since the spindle vibration of the turbine main spindle is within the tolerance, a trip of the gas turbine can be avoided. As a result, the time required from the startup to the rated load operation of the gas turbine can be shortened, and hence the starting loss can be reduced. Further, with the program for allowing a computer to execute the operation method of the gas turbine, the operation method of the gas turbine can be realized by using a computer.

With the operation method of gas turbines according to this invention, the coolant for the dynamic blade is changed from the casing air to the steam after equalizing the casing air temperature and the steam temperature at the time of the so-called partial load of the gas turbine. When the coolant for the hot members of the gas turbine, such as the dynamic blade and the turbine main spindle, is changed from the casing air to the steam, if the temperatures of the casing air and the steam are equalized, the spindle vibration can be suppressed within the tolerance. Therefore, even in the state that the load is applied to the gas turbine, the coolant for the dynamic blade or the like can be changed, and hence the shifting from the startup to the rated load of the gas turbine can be shortened. The starting loss can also be reduced. Further, with the program for allowing a computer to execute the operation method of the gas turbine, the operation method of the gas turbine can be realized by using a computer.

With the operation method of gas turbines according to this invention, when the coolant for the combustor is changed from the steam from the plant auxiliary steam generator to the steam from the heat recovery steam generator which generates steam by the exhaust heat of the gas turbine, the steam turbine is connected to the generator. As a result, since the steam turbine can be connected to the generator, matching with the period of changing the steam for cooling the combustor, the time required for the rated load operation can be shortened, and the starting loss can be also reduced. Further, by the program for allowing a computer to execute the operation method of the gas turbine combined electric generating plant, the operation method of the gas turbine can be realized, by using a computer.

With the operation method of the gas turbine combined electric generating plant according to this invention, the period for changing the coolant for the stationary blade from the steam of a plant auxiliary steam generator or the like to the steam of the HRSG is overlapped on the period for increasing the load of the gas turbine from the partial load to the rated load. Even if the coolant having a slight temperature difference and density difference for the stationary blade, the combustor or the combustor tail pipe, being the stationary system, is changed, the rotation system is hardly affected, and a trip of the gas turbine does not occur. Therefore, since the steam for cooling the stationary blade can be changed, with an increase of the load of the gas turbine, the time required for the rated load operation can be shortened, and the starting loss can be reduced. Further, with the program for allowing a computer to execute the operation method of the gas turbine combined electric generating plant, the operation method of the gas turbine can be realized by using a computer.

In the gas turbine combined electric generating plant according to this invention, when the coolant for the dynamic blade and the like is changed from the casing air to the steam, after the temperatures of the casing air and the steam are equalized, the changeover is carried out during the connection period of the gas turbine with the generator. Since the time required from the startup to the rated operation of the gas turbine can be shortened, the starting loss can be reduced. Further, since the time required from the startup to the rated load operation is short, personnel expenses for operators can be also suppressed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An operation method of a gas turbine for changing a coolant for cooling hot members in the gas turbine from casing air to steam, comprising:
   measuring temperatures of the casing air and the steam and comparing the temperatures;
   adjusting at least one of temperatures of the casing air and the steam to equalize the temperature of the casing air and the temperature of the steam; and
   changing the coolant for the hot members from the casing air to the steam during a connection period of the gas turbine with a generator after having equalized the temperature of the casing air and the temperature of the steam.

2. A computer readable medium embodying a computer program for instructing the computer to carry out an operation method of a gas turbine for changing a coolant for cooling hot members in the gas turbine from casing air to steam, the method comprising:
   measuring temperatures of the casing air and the steam and comparing the temperatures;
   adjusting at least one of temperatures of the casing air and the steam to equalize the temperature of the casing air and the temperature of the steam; and
   changing the coolant for the hot members from the casing air to the steam during a connection period of the gas turbine with a generator after having equalized the temperature of the casing air and the temperature of the steam.

* * * * *